July 15, 1969  JUN TAGA  3,454,989
MACHINE FOR MOLDING THERMOPLASTIC SYNTHETIC RESINS
Filed Aug. 25, 1964  2 Sheets-Sheet 1

INVENTOR.
JUN TAGA
BY
ATTORNEYS

INVENTOR.
Jun TAGA
BY McGlew and Toren
ATTORNEYS

United States Patent Office 3,454,989
Patented July 15, 1969

3,454,989
MACHINE FOR MOLDING THERMOPLASTIC
SYNTHETIC RESINS
Jun Taga, 5664 Ikuta, Kawasaki,
Kanagawa Prefecture, Japan
Filed Aug. 25, 1964, Ser. No. 391,919
Claims priority, application Japan, Aug. 26, 1963,
38/45,035
Int. Cl. B29f 1/02
U.S. Cl. 18—30                                   2 Claims

ABSTRACT OF THE DISCLOSURE

The disclosure relates to a molding machine for plastics comprising separable mold parts and a charger that retreats from the interior of the separable mold parts as it charges plastic therein.

---

The present invention relates to a machine for the molding of thermoplastic synthetic resins.

It is well known that the recent plastic molding industry calls for the production of larger and larger integral molded articles. This involves technical difficulties of extruding and injecting plastic materials at an uniform rate from a plastic material plasticizing and delivery mechanism to all parts of mold cavities. It is also well known that the industry demands the molding of articles in complex forms, which requires that the molded material be forced during molding even the finest and most intricate portions of a mold cavity.

These new trends in the plastic molding industry have also brought to light new problems of developing a machine in which a mass of plastic material injected into a mold is prevented from contraction in the molding stage, and a molded article produced thereby exactly corresponds with the size in demand.

Briefly speaking, the present invention machine for the molding of thermoplastic synthetic resins has solved the problems of the prior art by employing a plastic material plasticizing and delivery mechanism, wherein a barrel can be driven into a separable mold and retreated from the mold during an injection cycle as the material is advanced into the mold in a plasticized state under pressure. The apparatus includes a mold with separable mold parts which may be brought together over an end gate plate having compressed air charging aperture.

Thus, one object of the present invention is to provide a machine for the molding of thermoplastic synthetic resins which can continuously produce large integral molded articles, characterized by their uniformity.

Another object of the invention is to provide a machine for the molding of thermoplastic synthetic resins which can produce molded articles of complex and intricate shape following even the finest and most intricate details of a mold cavity.

Further another object of the invention is to provide a machine for the molding of thermoplastic synthetic resins which can keep a mass of plastic material injected into a mold from contraction in the molding process, and produce a molded article conforming with the sizes in demand.

Figure 1:
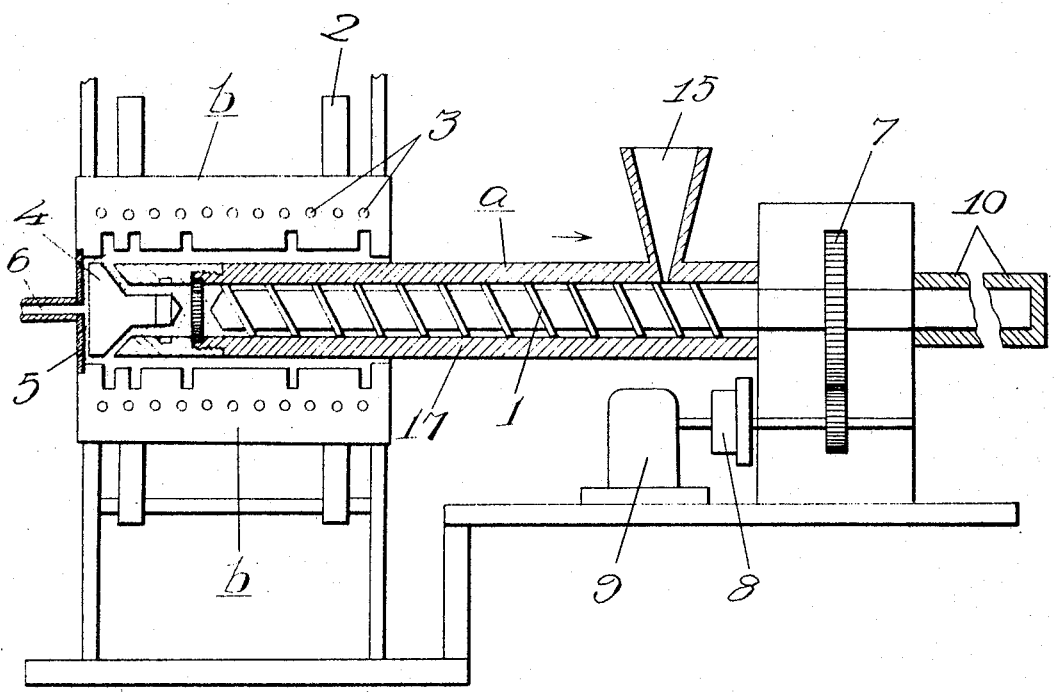
Figure 2:
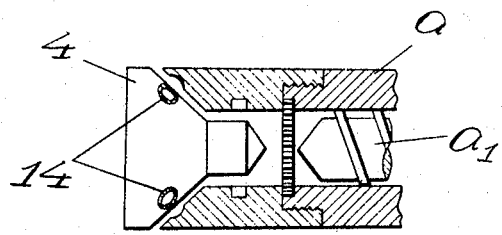
Figure 3:
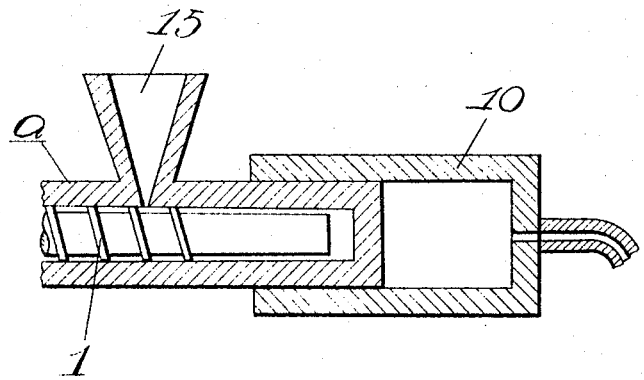
Figure 4:
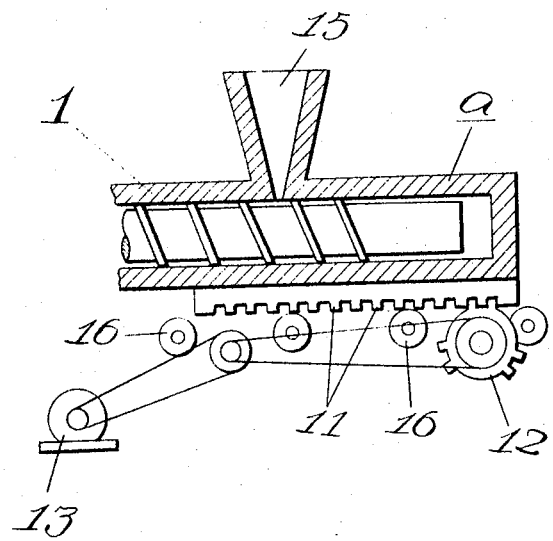

The above and other objects of the present invention will be more apparent upon consideration of the accompanying drawings, in which:

FIG. 1 is a view in vertical axial section through a full scale machine for the molding of thermoplastic synthetic resins of the present invention comprising a plastic material plasticizing and delivery mechanism provided with its screw rotating mechanism and its barrel reciprocating mechanism, and a separable mold, the plastic material plasticizing and delivery mechanism being shown in operative relation with the mold being closed;

FIG. 2 is a partial enlarged vertical section of the plasticizing mechanism shown in FIG. 1; and FIGS. 3 and 4 show partial sectional views similar to FIG. 1 of two embodiments of the barrel reciprocating mechanism.

A separable mold b, consisting of separable mold parts and constructed as to be assembled or separated by a motivating power source 2 such as a hydraulic system or other mechanism includes an open rear end for receiving a front end of a plastic material plasticizing and delivery mechanism a. The longitudinal axis of a barrel 17 of the mechanism a is substantially aligned with the horizontal axis of the mold cavity. The mold b is provided with holes 3 for circulating fluid for regulating the temperature of the mold b.

When the parts of the separable mold b are opened, the barrel 17 of the mechanism a is driven into the interval between the mold parts and stopped at a predetermined position by conventional arresting gears (not shown). Then, the mold parts are closed by the motivating power source 2 and clamped together around a gate plate 5. Concurrently, the barrel 17 of the mechanism a is gradually moved away from the gate plate 5 in the mold b in the direction shown by an arrow in FIG. 1, in accordance with the stage and cycle of the feed and plasticizing of the plastic material by the plasticizing and delivery mechanism a. The molten plastic is discharged over an injection die 4 provided at the front end of the barrel 17 and is directed into the cavity of the mold b along its outer walls. Material to be plasticized is supplied from a hopper 15 mounted on the barrel 17. The material is fed and plasticized by rotation of screw 1 during operation.

The rotation of gate plate 5 is provided with a compressed air charging aperture 6, so that compressed air can be supplied to the mold in order to prevent the mass of plastic material injected into the mold from contracting by heat. When an intricate mold is used, in order to avoid deficiency of injection supply of the molten materials into intricate cavities of the mold, the delivery of the molten materials from the plastic material plasticizing and delivery mechanism a into the mold b may be controlled either by making the rotating speed of a screw 1 of the mechanism a changeable through interposing a torque converter 8 between a gear mechanism 7 which rotates the screw 1, and a motor mechanism 9, or, as illustrated in FIG. 3, by adjusting the retracting speed of the mechanism a to the phases of a mold used, through employing a hydraulic mechanism 10 which is provided to the back end of the barrel 17 of the mechanism a and reciprocates the barrel toward and away from the mold b at a predetermined cycle.

In another embodiment illustrated in FIG. 4, a rack 11 is secured to a bottom face of the barrel 17 of the mechanism a and it is engaged with a pinion 12 having teeth corresponding to an injection cycle. The pinion 12 is moved by a motive source 13 through reduction gears 16. The plastic material plasticizing and delivery mechanism a may be retreated intermittently from the mold b in accordance with the various phases of injection into the cavity of the mold, resulting in delivering plastic materials in proportion to the intricate cavities of the mold. The circumferential pitch of said pinion 12 may preferably correspond to the working length of the barrel 1 of the mechanism a, the teeth of the pinion being arranged in accordance with the phases of the mold cavity.

Further, various parts of the present invention machine may be regulated by means of an appropriate speed controlling means such as electric switches, so that they can maintain synchronism therebetween during a cycle.

In addition to the novel constructions described above, a single expansible and contractable pipe ring or a plurality of radially spaced pipe rings 14 are arranged in an annular area opposite an oblique wall of the barrel at its discharge end. The rings 14 are made from a material such as silicon rubber and the like and are embedded in the tapered side of the injection die 4. The pipe rings 14 expand and contract in proportion to the pressure exerted by the plastic material on the die orifice formed between the tube 17 and the injector die 4.

For purposes of illustration, I have shown and described a preferred embodiment of the present invention machine for the molding of thermoplastic synthetic resins, particularly of the horizontal type, it is to be understood that such embodiment is illustrative only and that the invention is capable variation as to details.

What I claim is:

1. A machine for molding articles from plastic material comprising a plasticizing and feeding device including a tubular plasticizer housing having a feed inlet for the material to be plasticized and a discharge for the plasticized material at one end, a rotatable plasticizing screw in said housing for plasticizing the material and for feeding it from said inlet to said discharge, a mold having separable mold parts which together define a plurality of cavities which may be separated for removing a molded article and having a plasticizer housing receiving opening adjacent one end, means mounting said mold and said tubular plasticizer housing permitting inserting of said plasticizer housing well within said mold to permit discharge of the plasticized material from the inner end of said mold whereby to fill all of said cavities therein and permitting relative movement between said mold and said plasticizer housing as the filling of said mold progresses whereby the tubular housing will be displaced relatively along the interior of the mold until it is entirely filled with plasticized material, a rack carried by said tubular housing, a driving pinion engaged with said rack for moving said rack with said housing relative to said mold, said pinion having a number of teeth corresponding to the phases of the cavities in the mold and motor means connected to drive said pinion to rotate said pinion and move said rack in order to move said tubular housing in respect to said mold at a predetermined speed in accordance with the teeth of said rack and the speed of rotation of said motor means.

2. A machine for injection molding hollow articles from plastic material comprising a plasticizing and feeding device including a tubular plasticizer housing having a feed inlet for the material to be plasticized, and means adjacent one end of said housing defining a circumferentially opened discharge for the plasticized material at one end, a rotatable plasticizing screw in said housing for plasticizing the material to be plasticized and for feeding it from said inlet out said discharge, a mold having separable mold parts which may be separated for removing a molded article and which may be joined together to define an elongated cavity having an inner closed end and an opposite end with an opening into which said plasticizer housing is movable, and means mounting said mold and said tubular plasticizer housing permitting relative movement therebetween and the insertion of the discharge of said plasticizer housing into the cavity to a position adjacent the inner closed end thereof to permit the circumferentially directed discharge of the plasticized material from the housing into the cavity starting from the inner closed end of said mold cavity whereby to fill all of the space within said cavity between said tubular plasticizer housing and said mold progressively toward the opposite end during relative movement between said mold and said plasticizer housing, said tubular housing including a die piece adjacent one end defining at least one opening between said die piece and the housing for the discharge of material from said tubular housing, and at least one expansible and contractible ring member disposed between said die piece and the housing at the location of the opening which is expansible and contractible in accordance with the pressure of the material at the discharge opening.

References Cited

UNITED STATES PATENTS

| 873,559 | 12/1907 | Koontz. |
| 1,858,956 | 5/1932 | Hepperle. |
| 2,801,444 | 8/1957 | Lorenian. |
| 3,259,682 | 7/1966 | Neville et al. |
| 3,281,899 | 11/1966 | Dacco. |

FOREIGN PATENTS

| 1,029,543 | 3/1953 | France. |
| 828,144 | 2/1960 | Great Britain. |

WILBUR L. McBAY, Primary Examiner

U.S. Cl. X.R.

18—5; 264—94, 329